May 29, 1962 R. REUTER 3,036,611

EGG CUTTER

Filed Aug. 31, 1959

INVENTOR.
Robert Reuter
BY Elliot A. Salter
Attorney.

United States Patent Office 3,036,611
Patented May 29, 1962

3,036,611
EGG CUTTER
Robert Reuter, 25 Cread Place, Warwick, R.I.
Filed Aug. 31, 1959, Ser. No. 837,196
3 Claims. (Cl. 146—2)

The present invention relates generally to a cutting device for household use and is particularly concerned with the provision of a novel and improved egg cutter.

A primary object of the instant invention is the provision of a highly simple and yet effective device for cutting eggs and the like in two, particularly when said eggs are still within their shell. It will be understood, however, that the instant invention is not limited to use as an egg cutter, but rather it may be used to cut or slice other articles of similar shape, such as various fruits and vegetables. On the other hand, it is once again emphasized that the primary value and utility of this invention is to provide ready and easily operated means for cutting or slicing eggs, particularly when the egg is still in its shell.

Other attempts have been heretofore made to provide egg cutters of the instant type, but these prior art devices have generally proven to be unsatisfactory in that they were generally of somewhat complicated construction, usually involving a series of moving parts, whereby the cost of such an item was out of line with the relatively simple function to be accomplished thereby. In addition, many of the prior art devices of this type have proven unsatisfactory in operation due to the fact that only a single blade was used to shear the egg in two, thereby sometimes resulting in crumbling of the egg or cracking of the shell during the cutting operation.

It is therefore an important object of my invention to provide an egg cutter which is of integral, one-piece construction, thereby eliminating the presence of any moving parts, and at the same time enabling the device to be easily and inexpensively manufactured.

Another object of my invention is the provision of an egg cutter of the character described having opposed cutting edges which simultaneously move in opposite directions to effect a shearing operation, whereby the egg is cleanly and effectively cut in two.

A further object of this invention is the provision of an egg cutter of the character described having means for minimizing the likelihood of cracking of the egg shell during the cutting operation.

Another object of this invention is the provision of the device of the character described which, in spite of its extreme simplicity, is both durable and effective in operation, as well as being constructed for convenient and comfortable handling by the user.

Other objects, features and advantages of the invention will become apparent as the description thereof proceeds when considered in connection with the accompanying illustrative drawings.

In the drawings which illustrate the best mode presently contemplated by me for carrying out my invention:

Figure 1:
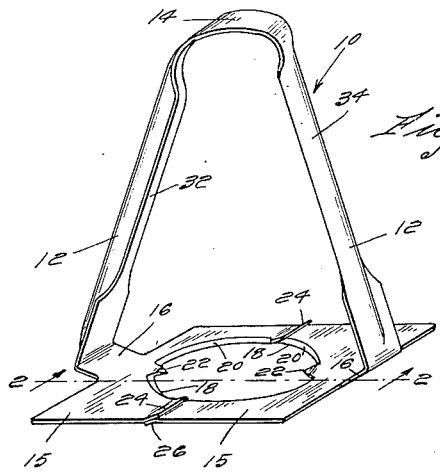
FIG. 1 is a perspective view of an egg cutter embodying the instant invention.

Referring now to the drawings, my egg cutter is shown generally at 10 and comprises a body having a pair of depending legs 12 connected at their upper extremity as at 14 so as to provide an inverted, substantially U-shaped configuration. At their lower extremities, the legs 12 are each provided with an inwardly extending cutting plate 15 to be more fully described hereinafter. As will be noted, the cutter 10 is of integral, one-piece construction, and it may either be formed from sheet metallic stock, or else it may be molded of a suitable plastic. The specific material employed is not critical, although it will be understood that the material should be sufficiently hard so as to enable a clean cut to be obtained, while at the same time the material should have sufficient resilience so that the device will normally be biased to the position illustrated in FIGS. 1 and 2.

In order that the cutting plates may move toward and away from each other in a substantially horizontal plane, said plates are connected to legs 12 by slightly angled strips 16. As will be obvious, if this angled interconnecting strip were not employed, then in and out movement of the cutting plates 15 would assume a more arcuate path, when viewed in cross section, thereby minimizing the effectiveness of the instant device in that the cutting operation would not be as clean and efficient.

The cutting plates 15 are each substantially rectangular in configuration, and each is provided with an arcuate cut-out 18 of substantially semi-circular configuration, said cut-outs cooperating to define a substantially circular opening adapted to receive the egg or other article that is to be cut. The edges of cut-outs 18 are beveled as at 20 to provide a relatively sharp cutting edge, and at the center portion of each said cut-out there is provided an inwardly extending prong 22. The purpose of the prongs 22 is to provide means for puncturing the shell of the egg as the cutting operation is commenced. This performs two important functions. First of all, when the prongs 22 puncture opposite sides of the egg shell, the egg is firmly and securely gripped within the device, and there is no tendency for it to slip or rotate during the cutting operation. In addition, by puncturing or penetrating the egg shell, a much cleaner and sharper cut can be effected, since where the shell is not first punctured in this manner, it has been found that there is a tendency for the shell to crack adjacent the cut due to the crushing action of the cutting blades as they move toward each other. By first puncturing the shell, however, the cut, in effect, is given a start, whereupon as the cutting plates move toward each other, a much finer and sharper cut is effected, and a minimum of cracking takes place.

In order to insure that the plates 15 will properly overlap each other in shearing relation, the opposed lateral edge portions of the plates are reversely bent. More specifically, the lateral edge portions of one of the plates is bent upwardly as at 24, while the opposed lateral edge portions of the other plate is bent downwardly as at 26. This, of course, insures that the edges of the plates will overlap whereupon the proper shearing action will be effected when inward pressure is applied to the legs 12. Without these reversely bent edges, it would be possible for the inner edges of the lateral plate portions to butt against each other, thereby preventing closing or cutting movement of the device.

Figure 5:
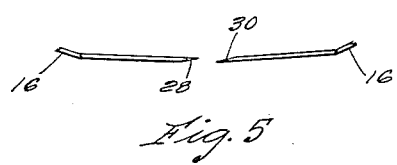
FIG. 5 is a fragmentary front elevational view of a slightly modified form of my invention.

As an alternative to the reversely bent edges 24, 26, the lateral edges could be oppositely beveled as at 28, 30, in FIG. 5. This would give substantially the same results, although this arrangement has been found to be less preferable than the reversely bent edges in that the latter provides a more positive and smoother overlapping of the plates.

In order to impart greater rigidity to the legs 12, said legs are preferably formed of channel-like configuration, as indicated at 32, it being noted that the open portions of the channels face each other. This provides a smooth and comfortably rounded handle 34, which makes the device easier and more comfortable to handle.

Figure 2:
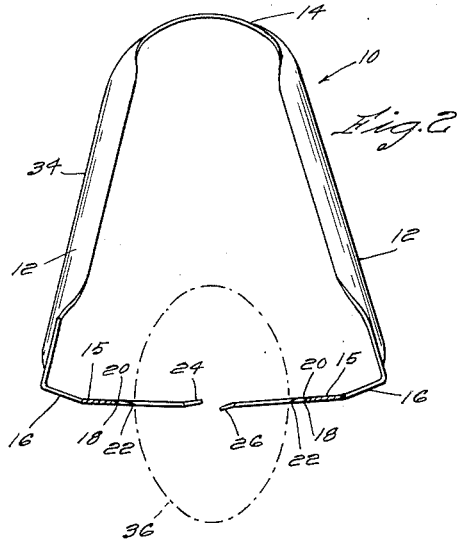
FIG. 2 is a front elevational view thereof, partly in section, taken on line 2—2 of FIG. 1, the device being shown in its open or spread-apart position.
Figure 3:
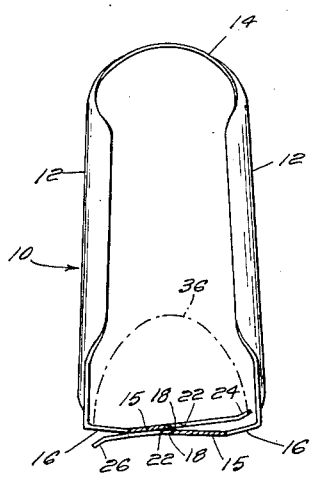
FIG. 3 is a view similar to FIG. 2 showing the device in its closed or cutting position.
Figure 4:
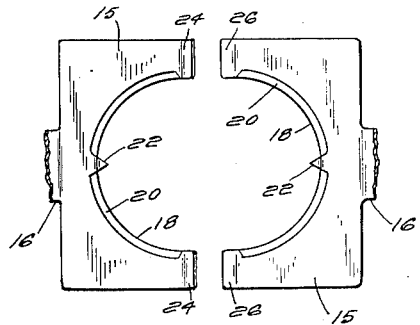
FIG. 4 is a plan view of the cutting plates, the upper portion of the device being broken away for purposes of illustration.

It is thought that the operation of the egg cutter 10 will be apparent from the foregoing description, but a brief summary of same will now be given. An egg or similar article 36 is placed within the opening defined by the arcuate cut-outs 18, as illustrated in FIG. 2, it being noted that in this position the device 10 is in its open or spread-apart position. Holding the bottom of the egg in one hand, the legs 12 are gripped by the user's other hand and are forced together until the parts assume the position illustrated in FIG. 3. It will be understood that during this operation the prongs 22 first puncture or penetrate opposite sides of the egg shell and then the cutting edges 20 overlap each other in shearing relation until the egg is completely cut in two. The opposed reversely bent edges of the cutting plates function to insure that said plates will not jam against each other when the legs 20 are first pressed inwardly. After the cutting operation has been completed, the pressure on the legs 20 is released, whereupon the resilience of the material of which the device is constructed will automatically cause the legs to spring outwardly to the normal position of the parts illustrated in FIGS. 2 and 4.

It will therefore be seen that there has been provided in accordance with the instant invention a device which is capable of accomplishing all of the objects enumerated supra. More specifically, the device is simple and relatively inexpensive to manufacture in that it is of integral, one-piece construction, but yet, due to the various structural features hereinbefore described, it is extremely efficient in operation.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In a device for cutting the shell of an egg, a one-piece body having a pair of spaced legs connected at one end thereof and defining a substantially U-shaped configuration, said legs being formed in a channel-like configuration with the open part of said channels facing each other, each of said legs being formed with an inwardly angularly inclined connecting strip on the other end thereof to which an inwardly extending plate is joined, opposed arcuate cutouts formed in each of said plates and cooperating to define a substantially circular opening, said cutouts being beveled at the edges thereof to form relatively sharp cutting edges, an inwardly extending prong for piercing the egg shell formed on each of said cutouts directly opposite a leg, said prongs thereby being disposed in opposed relation and being adapted to pierce said egg shell on diametrical sides thereof, wherein said prongs act to hold said egg in position prior to the shearing of the shell thereof by said cutting edges, said plates being slightly offset with respect to each other so that when an egg is placed in said opening and the legs are forced inwardly toward each other, the cutting edges of said plates cooperate to shear said egg shell in two.

2. In a device for cutting the shell of an egg as set forth in claim 1, each of said plates including portions that extend laterally from said cutouts, the opposed edges of said lateral portions being oppositely bent so as to enable said plates to overlap each other in shearing relation when said legs are forced together.

3. In a device for cutting the shell of an egg, a one-piece body having a pair of spaced legs connected at the uppermost ends thereof and defining an inverted, substantially U-shaped configuration, each of said legs including an inwardly extending plate formed on the lower end thereof, said plates having arcuate cutouts formed therein that cooperate to define a substantially circular opening, said cutouts being beveled at the edges thereof to define relatively sharp arcuate-shaped cutting edges, an inwardly extending prong for piercing the egg shell formed on each of said cutouts intermediate the cutting edges thereof, said prongs thereby being disposed in opposed relation and being adaped to pierce said egg shell on diametrical sides thereof, wherein said prongs act to hold said egg in position prior to the shearing of the shell thereof by said plates, said plates being slightly offset with respect to each other so that when an egg is placed in said opening and the legs are forced inwardly toward each other, the cutting edges of said plates cooperate to shear said shell in two.

References Cited in the file of this patent
UNITED STATES PATENTS

| 961,110 | Dennis | June 14, 1910 |

FOREIGN PATENTS

| 7,233 | Great Britain | A.D. 1905 |
| 16,450 | Great Britain | A.D. 1904 |
| 556,822 | Germany | Aug. 15, 1932 |